Nov. 22, 1960     S. WAGNER     2,960,786
NESTABLE CAR TOP SIGNS
Filed June 30, 1958
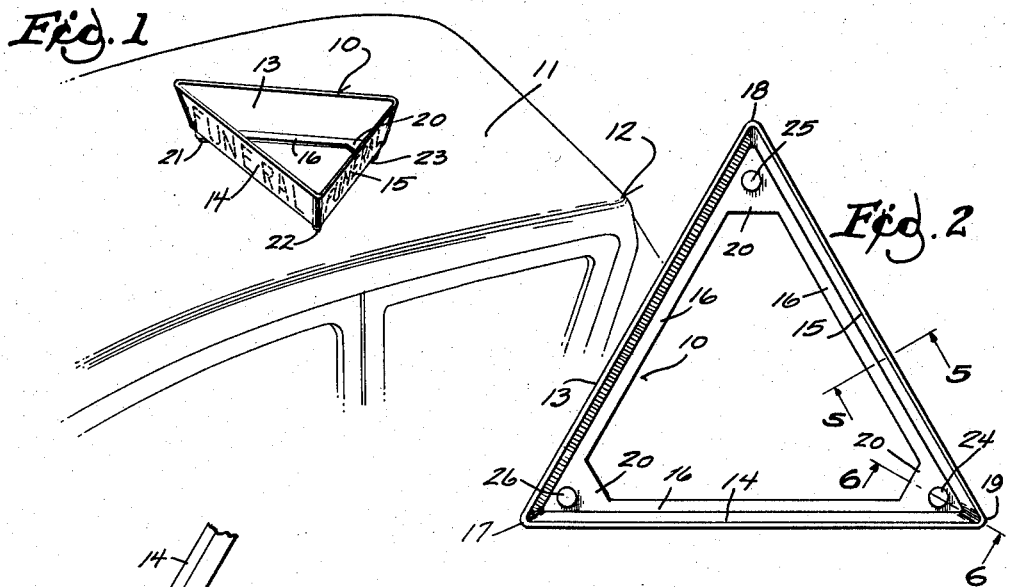
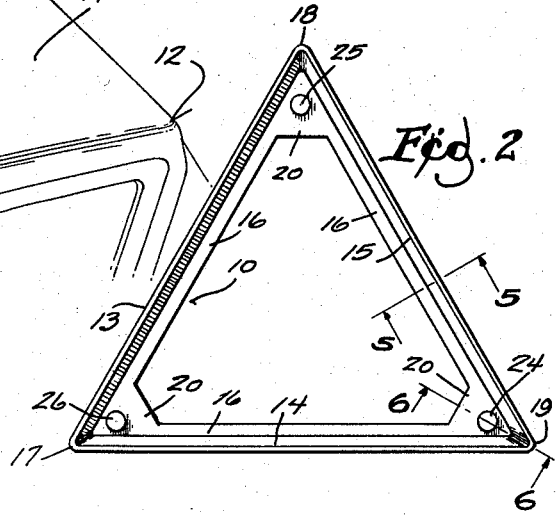
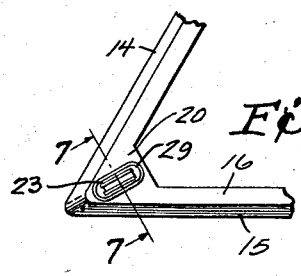
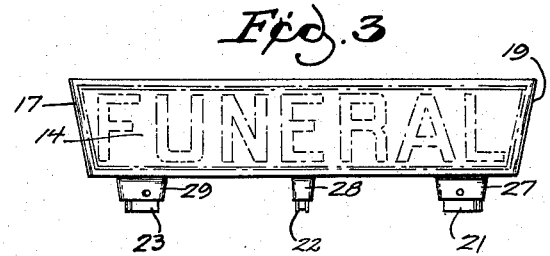
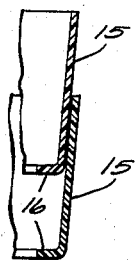
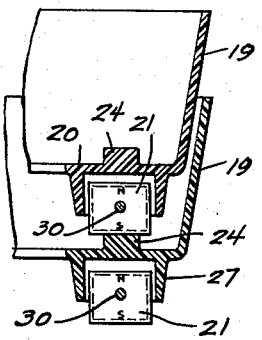
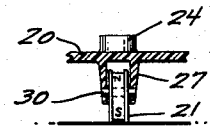
INVENTOR.
SAMUEL WAGNER
BY
Wheeler, Wheeler + Wheeler
ATTORNEYS United States Patent Office 2,960,786
Patented Nov. 22, 1960

2,960,786

NESTABLE CAR TOP SIGNS

Samuel Wagner, 2405 E. Hillsdale Drive, Brookfield, Wis.

Filed June 30, 1958, Ser. No. 745,541

4 Claims. (Cl. 40—129)

This invention relates to improvements in nestable car top signs.

Certain devices including signs for use upon automobile body surfaces are used intermittently or under such circumstances that their application to the automobile body is not permanent, yet the device, when displayed, must be definitely attached or adhered to the automobile surface so that there is no danger that the sign will be accidentally dislodged. Furthermore, signs, when removed from the automobile, must be stored in such a way as to occupy as little space as possible and to assure that the surfaces of the sign will not be scratched or disfigured during storage. To meet this requirement, the sign as shown in the drawings has been devised for magnetic attachment of the sign to the particular automobile body surface; has been designed with tapered sign surfaces to facilitate nesting of one sign within another; has been devised with magnetic attaching means secured to the sign in such a position as to facilitate the nesting operation and to assure protection of sign surfaces from abrasion; and the invention provides for compatibility of the sign with the contours of supporting surfaces provided by an automobile body whereby to constitute the sign structure a most adaptable and useable display accessory.

In the drawings:

Fig. 1 is a perspective of the complete sign as it appears upon the top of a modern automotive vehicle.

Fig. 2 is a top plan view of the complete sign.

Fig. 3 is an elevation of the sign shown in Fig. 2.

Fig. 4 is a bottom plan view showing fragmentarily a corner of the sign.

Fig. 5 is a fragmentary view in vertical section showing portions of two nested signs, the section as to one of the signs being on line 5—5 of Fig. 2.

Fig. 6 is a fragmentary view in vertical section of portions of two nested signs, the section as to one of the signs being on line 6—6 of Fig. 2.

Fig. 7 is a fragmentary view of a portion of the magnet mounting for a sign, the section being taken upon line 7—7 of Fig. 4.

The particular exemplification of the invention as shown in the drawings is a triangularly shaped funeral sign placeable upon a portion of an automobile body, such as the top or hood, although, as shown in Fig. 1, it is the actual top of the automobile body which is shown as a supporting surface. Here the sign 10 is triangular in general shape and is supported by and attached to the top 11 of automobile 12 on a tripod magnetic footing. Side walls 13, 14 and 15 each have a cross section as shown in Fig. 5 to include an upwardly, outwardly inclined wall section and an inturned lower marginal flange 16. At the corners 17, 18 and 19, the side walls merge into fairly sharp configuration like the clipper bow of a vessel and the flanges 16 are widened as shown most clearly in Figs. 2 and 4 to provide a platform 20, triangular in shape, and designed to strengthen and brace the side walls for generally rigidity of structure. Also these platforms at 20 provide mounting not only for magnets 21, 22 and 23, but also provide a basis for spacers 24, 25 and 26.

Each of the magnets is mounted in a truncated tapered oval capsule 27, 28 and 29 as shown in Figs. 3, 6 and 7, and as shown most clearly in Figs. 6 and 7 a magnet such as magnet 21 is loosely receivable in its capsule 27 so that a single pivot pin 30 extending through the walls of the capsule and through the magnet hold it in the capsule with a portion of the magnet extending therefrom. The magnet is free to oscillate somewhat upon its pivot pin.

Exterior surfaces of side walls 13, 14 and 15 may receive any insignia or decoration to carry out the purpose of the sign 10. The illustrated funeral sign is, of course, a removable sign to be placed upon an automobile for temporary use and then removed for storage until the sign is needed once more. Obviously, the curvature of the car top 11 upon which the sign is used upon one occasion will not conform exactly to the contour of another top of another automobile when the sign is next used. Therefore, the tripod support of the sign and the oscillation of the magnet elements 21, 22 and 23 makes it possible for this sign to take its position solidly and compatibly with the magnetically responsive metal top of any car.

It will also be noted that the spacers 24, 25 or 26 each extend upwardly from the platform 20 with which it is associated and is so positioned with reference to a magnet of a superimposed or nested sign as to receive the magnet thereof in abutment against this spacer. Thus they keep the side walls of the nested signs in spaced relation. To a degree this assists the keeping of the north and south poles of the magnets in "keeper" relationship since the poles are arranged as shown clearly in Fig. 6.

It will now be clear that because of the tapered relationship of the side walls of the respective nested signs and the conformity of position of magnets with spacers as shown in the drawings, these nestable signs are in good storage relationship to each other and may be stored readily for use. While nested, there is a natural protective relationship of one sign with respect to another and abrasion of sign surfaces is minimized. Also the magnetic elements 21, 22 and 23 are positioned to render full service as attaching and supporting means for the signs when they are in use upon a car and they interfere not at all in the nesting relationship of the signs.

I claim:

1. A polygonal sign structure having side walls upwardly and outwardly flared, pairs of said side walls converging to provide clipper bow corners whereby a plurality of said structures are nestable, each of said corners being provided with an inwardly extending platform, a magnet and magnet mounting for each corner connected to said platform whereby said magnet is supported inwardly of said corner.

2. The sign of claim 1 wherein the platform is provided with an upwardly extending spacer in position to be abutted by a magnet of a nested sign before the sidewalls come into nested contiguity.

3. A sign device for temporary magnetic attachment to a surface made of magnetic responsive material, said sign being polygonal in configuration and having side walls tapered in one direction for nesting of one sign within another, said converging walls providing corner configurations and including inwardly turned flanged portions shaped in contiguity to provide a platform within said corner, a capsule extending in said one direction from said platform and providing a mounting for a magnet, and a magnet mounted in said capsule for oscillation respecting the capsule.

4. A sign of the character described including three side walls connected to provide an open centered triangular shape, pairs of said walls being outwardly and upwardly flared with ends in contiguity to provide a platform across the corner at the lower margin thereof, said platform being in position to provide a mounting for a magnet, a magnet mounted to the under side of said platform, and a spacer mounted to the upper surface of said platform whereby one sign may be receivable within another sign to bring the magnet of one sign in abutment against said spacer, the dimensions of the sign walls, the magnet and its mounting and said spacer being such as to prevent the outer surfaces of the walls of one nested sign from contacting the inner surfaces of the walls of an outer sign.

References Cited in the file of this patent

UNITED STATES PATENTS

| | | |
|---|---|---|
| 1,605,703 | Brown | Nov. 2, 1926 |
| 2,077,585 | Rivers | Apr. 20, 1937 |
| 2,270,377 | McLauchlin | Jan. 20, 1942 |
| 2,775,832 | Vizza | Jan. 1, 1957 |
| 2,782,745 | Paschke | Feb. 26, 1957 |
| 2,817,308 | Scanlon | Dec. 24, 1957 |

FOREIGN PATENTS

| | | |
|---|---|---|
| 993,503 | France | July 25, 1951 |